(12) United States Patent
D'Orazio Pedro de Matos

(10) Patent No.: US 8,996,519 B2
(45) Date of Patent: Mar. 31, 2015

(54) AUTOMATIC ADAPTIVE CONTENT DELIVERY

(75) Inventor: Lucio D'Orazio Pedro de Matos, Antelope, CA (US)

(73) Assignee: Oracle International Corporation, Redwood Shores, CA (US)

( * ) Notice: Subject to any disclaimer, the term of this patent is extended or adjusted under 35 U.S.C. 154(b) by 414 days.

(21) Appl. No.: 13/417,678

(22) Filed: Mar. 12, 2012

(65) Prior Publication Data

US 2013/0238580 A1    Sep. 12, 2013

(51) Int. Cl.
*G06F 7/00*    (2006.01)
*G06F 17/30*    (2006.01)

(52) U.S. Cl.
USPC .................. 707/736; 707/722; 707/758

(58) Field of Classification Search
None
See application file for complete search history.

(56) References Cited

U.S. PATENT DOCUMENTS

| | | | |
|---|---|---|---|
| 6,308,175 B1 * | 10/2001 | Lang et al. | 707/608 |
| 6,885,734 B1 * | 4/2005 | Eberle et al. | 379/88.01 |
| 6,970,602 B1 * | 11/2005 | Smith et al. | 382/232 |
| 7,246,306 B2 * | 7/2007 | Chen et al. | 715/205 |
| 8,090,719 B2 * | 1/2012 | Wade et al. | 707/736 |
| 8,352,876 B2 * | 1/2013 | Batarseh et al. | 715/776 |
| 2002/0061506 A1 * | 5/2002 | Catten et al. | 434/369 |
| 2004/0002039 A1 * | 1/2004 | Draper et al. | 434/118 |
| 2006/0259469 A1 * | 11/2006 | Chiu | 707/3 |
| 2007/0073553 A1 * | 3/2007 | Flinn et al. | 705/1 |
| 2007/0094157 A1 * | 4/2007 | Flinn et al. | 706/2 |
| 2007/0154169 A1 * | 7/2007 | Cordray et al. | 386/83 |
| 2008/0092181 A1 * | 4/2008 | Britt | 725/87 |
| 2009/0049077 A1 * | 2/2009 | Lawlor | 707/102 |
| 2009/0241015 A1 * | 9/2009 | Bender et al. | 715/202 |
| 2010/0100899 A1 * | 4/2010 | Bradbury et al. | 725/29 |
| 2012/0222063 A1 * | 8/2012 | Mao et al. | 725/31 |
| 2013/0091519 A1 * | 4/2013 | McLauchlan et al. | 725/32 |

OTHER PUBLICATIONS

Zhao et al., "Personalized Adaptive Content System for Context-Aware Mobile Learning", Aug. 2008, IJCSNS International Journal of Computer Science and Network Security, vol. 8, pp. 153-161.*

* cited by examiner

*Primary Examiner* — Hexing Liu
(74) *Attorney, Agent, or Firm* — Miles & Stockbridge P.C.

(57) ABSTRACT

A system for adaptively delivering digital information to a user retrieves the digital information, which is comprised of a plurality of segments arranged in sequential order, each segment comprising one or more options, and each option presenting content of the segment in a different way from other options of the segment. The system selects from each segment an option likely to be the most suitable for the user, and delivers the selected option for each segment to the user in the sequential order. The system receives feedback on at least one of the options delivered to the user.

18 Claims, 7 Drawing Sheets

AUTOMATIC ADAPTIVE CONTENT DELIVERY

FIELD

One embodiment is directed generally to a computer system, and in particular to a computer system for providing an adaptive content delivery service.

BACKGROUND INFORMATION

The emergence of the Internet has given rise to a growing number of online education/training services. Execution of the online education/training frequently involves electronic delivery of the contents (e.g., course material, presentation charts, etc.). When the course is not led by an instructor, students are very often required to visit an online education/training website, download course material and study the chapters or segments of the course material in sequential order. While the students may benefit from the convenience of taking a course at their own time and location, and at their own pace, they sometimes suffer from the lack of personalized services, especially when certain topics need to be broken down to their individual level or explained in different ways. The typical online course materials offer the same content to all participants and are delivered in exactly the same way through the same texts and narrations. The participants very often find this "one size fits all" approach frustrating and are discouraged from completing the training.

SUMMARY

One embodiment is a system for adaptively delivering digital information to a user. The system retrieves the digital information, which is comprised of a plurality of segments arranged in sequential order, each segment comprising one or more options, and each option presenting content of the segment in a different way from other options of the segment. The system selects an option for the user for each segment, and delivers the selected option for each segment to the user in the sequential order. The system receives feedback on at least one of the options delivered to the user, which in turn the system uses to select the next option.

DETAILED DESCRIPTION

One embodiment is a system that automatically delivers digital content to users in a way that is the most suitable to each user. The digital content is divided into a plurality of segments. The plurality of segments are arranged in sequential order based on a linear relationship among the segments. Each segment is provided with a plurality of versions that present the same content in different ways. In presenting the segments to a particular user, one of the versions that is the most suitable to the user is selected and delivered to the user based on personal information of the user and historical data, or of other users who previously received the same content and provided feedback.

Figure 1:
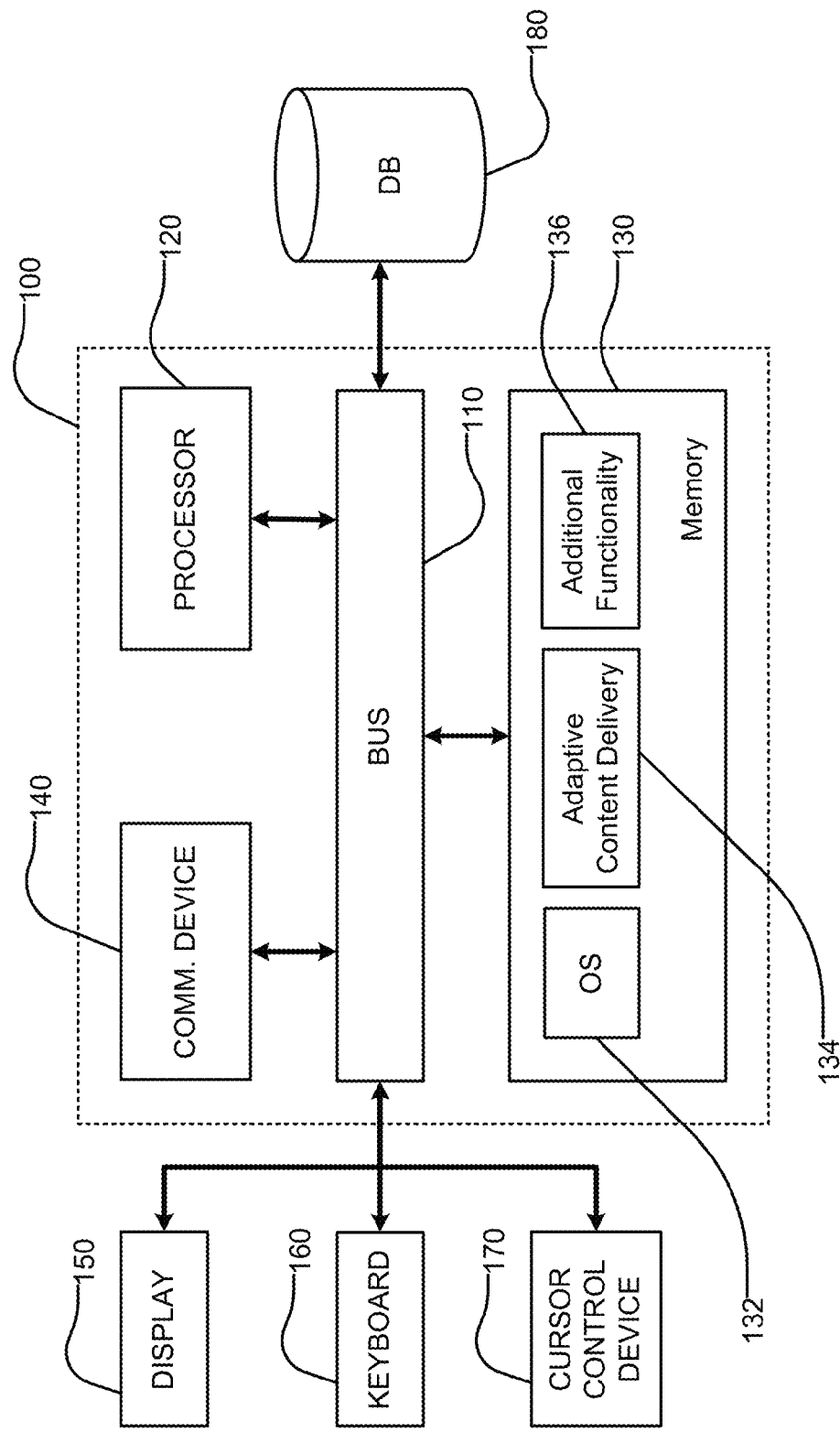
FIG. 1 is a block diagram of a computer system that can implement an embodiment of the present invention.

FIG. 1 is a block diagram of a computer system 100 that can implement an embodiment of the present invention. Although shown as a single system, the functionality of system 100 can be implemented as a distributed system. System 100 includes a bus 110 or other communication mechanism for communicating information, and a processor 120 coupled to bus 110 for processing information. Processor 120 may be any type of general or specific purpose processor. System 100 further includes a memory 130 for storing information and instructions to be executed by processor 120. Memory 130 can be comprised of any combination of random access memory ("RAM"), read only memory ("ROM"), static storage such as a magnetic or optical disk, or any other type of computer readable media. System 100 further includes a communication device 140, such as a network interface card, to provide access to a network. Therefore, a user may interface with system 100 directly, or remotely through a network or any other method.

Computer readable media may be any available media that can be accessed by processor 120 and includes both volatile and nonvolatile media, removable and non-removable media, and communication media. The communication media may include computer readable instructions, data structures, program modules or other data in a modulated data signal such as a carrier wave or other transport mechanism and includes any information delivery media.

Processor 120 is further coupled via bus 110 to a display 150, such as a Liquid Crystal Display ("LCD"), for displaying information to a user. A keyboard 160 and a cursor control device 170, such as a computer mouse, are further coupled to bus 110 to enable the user to interface with system 100.

In one embodiment, memory 130 stores software modules that provide functionality when executed by processor 120. Modules include an operating system ("OS") 132 that provides OS functionality for system 100. Modules further include an adaptive content delivery module 134, as disclosed in more detail below. System 100 can be part of a larger system, such as a mapping system or an enterprise resource planning ("ERP") system. Therefore, system 100 will typically include one or more additional functional modules 136 to include the additional functionality. A database 180 is coupled to bus 110 to provide centralized storage for modules 134 and 136 and store digital content, personal information, historical data, etc., which are described below in detail.

Figure 2:
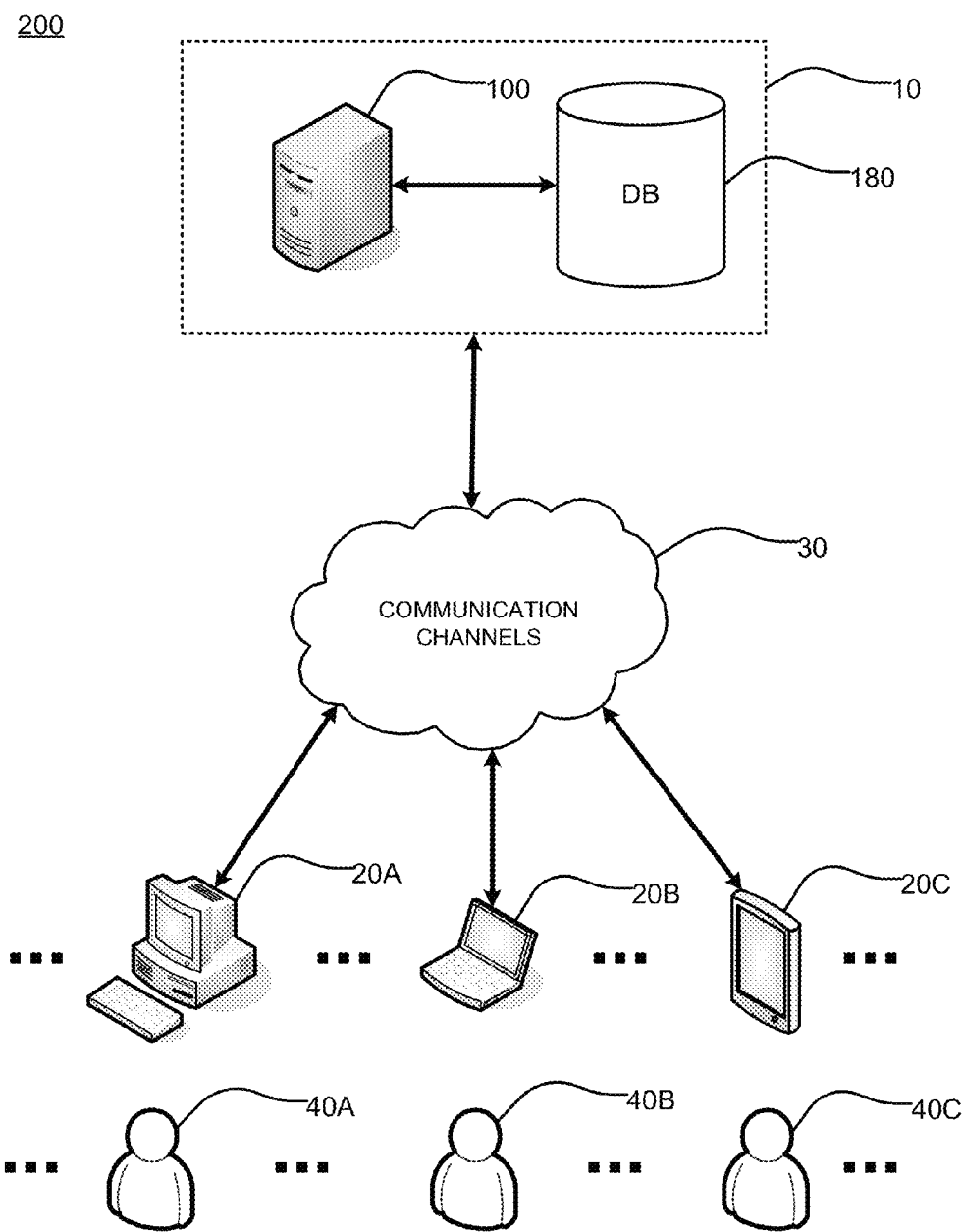
FIG. 2 illustrates a block diagram of a system that can implement an embodiment of the present invention.

FIG. 2 is a block diagram of a system 200 for providing an adaptive content delivery service according to one embodiment. System 200 includes an adaptive content delivery service provider 10 and a plurality of user devices 20 of users 40. Service provider 10 may include computer system 100 and database 180 shown in FIG. 1. Service provider 10 is coupled to user devices 20 via one or more wired/wireless communication channels 30. User devices 20 may include communication devices, such as, e.g., personal computer ("PC") 20A, portable computer 20B, tablet 20C, etc. Service provider 10 is configured to carry out the adaptive content delivery service for users 40 by communicating with user devices 20. For example, service provider 10 may operate a web application to carry out the adaptive content delivery service. A mobile application ("app") may be installed in tablet 20C and other mobile user devices to access service provider 10.

In one embodiment, the adaptive content delivery service is applied to delivering digital content to users 30. For example, service provider 10 is an online content provider that offers online courses (e.g., academic course, test preparation course, training course, instructional course, etc.), online presentations (e.g., demonstration, direction, advice, suggestion, opinion, story-telling, etc.), online promotions (e.g., product/service demonstration, offer, etc.), online assistances (e.g., installation guide, trouble-shooting, diagnostics, etc.), online commercial transactions (e.g., online retail, online reservation, online quoting, etc.), or the like.

Prior to delivering the digital content, the digital content is divided into a plurality of segments. The plurality of segments have a linear relationship, which means, for example, that the segments are related to each other in terms of continuity of their contents. Therefore, the plurality of segments may be arranged and delivered to users 40 in sequential order. Service provider 10 provides a plurality of versions or options for each segment. The versions or options of each segment may present the same content in different ways. For example, in presenting the content of each segment, one version may be prepared for those who are new to the topics of the segment, and another version may be prepared for the experts in the topics. As another example, one version may be a multimedia version including texts, sound clips and video clips, and another version may be a text and image only version for users with hearing impairment. Service provider 10 then analyzes various information, such as, e.g., personal information, historical data, etc., and by comparing user data and historical data, it applies conditions and decisions to select one of the plurality of versions or options for each segment that is the most suitable to a particular user.

Figure 3:
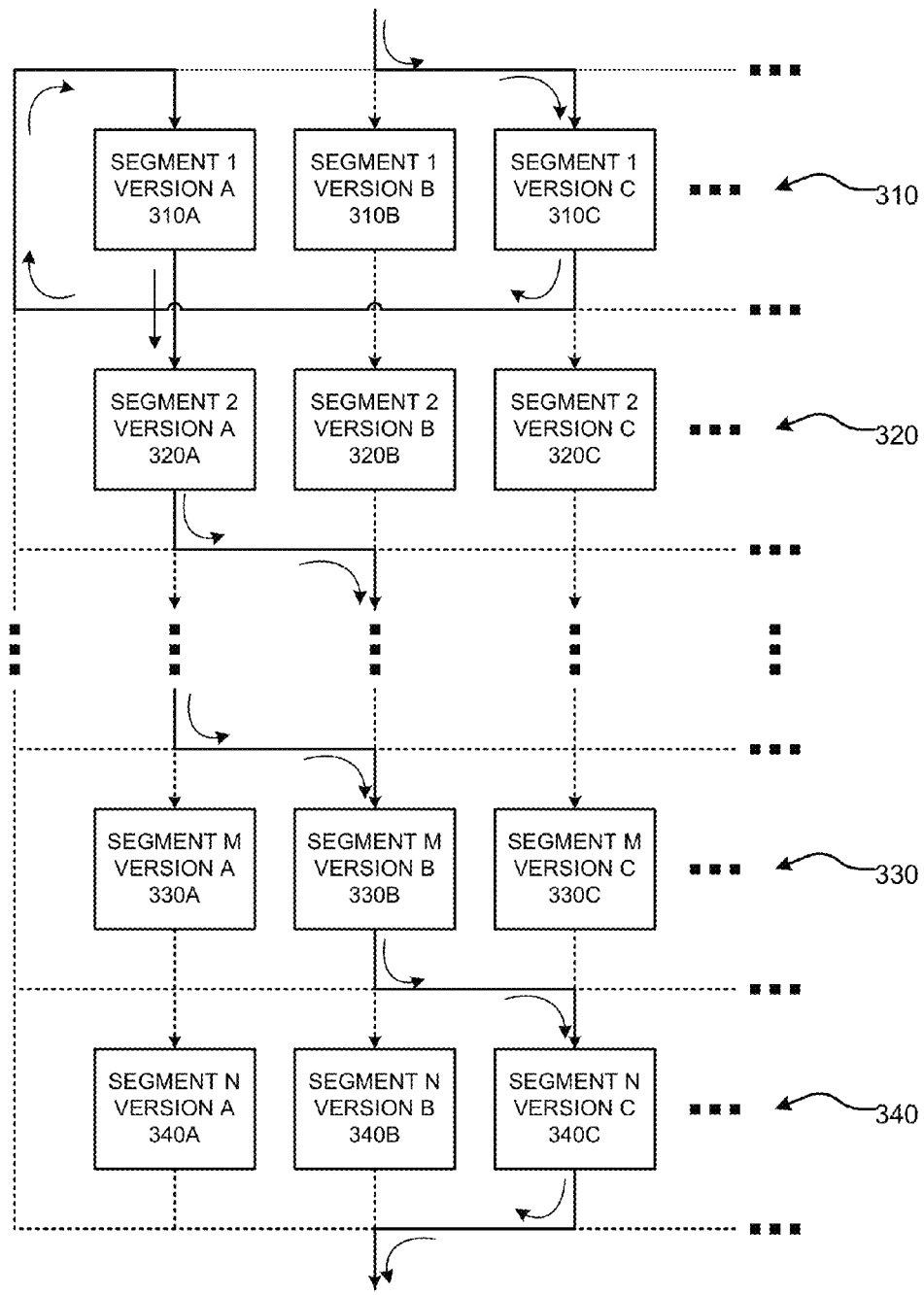
FIG. 3 illustrates an example of a segmentation/arrangement of digital content for adaptive content delivery in accordance with one embodiment.

FIG. 3 is an example of a segmentation/arrangement of digital content 300 according to one embodiment. Digital content 300 is divided into a plurality of segments, for example, first segment 310, second segment 320, . . . , (M)th segment 330, and (N)th segment 340. As noted above, each segment is provided with a plurality of versions. For example, first segment 310 includes version A 310A, version B 310B, version C 310C, etc. Second segment 320 includes version A 320A, version B 320B, version C 320C, etc. Segment M 330 includes version A 330A, version B 330B, version C 330C, etc. Segment N 340, which is the last segment, includes version A 340A, version B 340B, version C 340C, etc. In an embodiment, a number of versions in each segment may vary. For example, one segment may have a single version, and another segment may have more than three versions.

Prior to delivering digital content 300 to a particular user, for example, user 40A, service provider 10 may collect and analyze personal information of user 40A. The personal information may include the particular user's preferences, age, sex, language, location, disabilities, nationality, educational level, skill level, interest level, familiarity with the topics, goals, product/service purchase history, or any other demographic information. The preferences may include indications on whether user 40 prefers a text-oriented presentation, an audio-based presentation, a multimedia-oriented presentation, a slower but detailed presentation, a faster and brief presentation, etc. The location of user 40A may be obtained from an Internet Protocol ("IP") address of user device 20C. Based on the location of user 40A, service provider 10 may select each version that is prepared in the most common language in the location.

Embodiments may function even if the personal information is initially completely blank/empty. Some users 40 may not want to disclose their personal information. Accordingly, in another embodiment, service provider 10 may not collect any personal information directly from users 40. Instead, service provider 10 may build certain personal information with time as more direct and indirect feedbacks are collected from users 40. For example, the personal information of user 40A may be initially empty, except for bare minimum information that is required to keep track of user 40A, such as, e.g., user identifier, session identifier, etc. Then, service provider 10 may track user 40A using the user identifier or the session identifier to monitor which content delivery type works and which content delivery type does not work for user 40A. This tracking information may be associated with the user identifier or the session identifier. Service provider 10 then compares the tracking information to the historical data to identify the most suitable version for the subsequent segments. For example, service provider 10 may compare the tracking information of user 40A with previous users who had similar tendencies and abilities. Therefore, service provider 10 may carry out the content selection process without collecting any personal information from user 40A.

For example, assume a user just finished segments 1A, 2B and 3C, well satisfied, and is about to take segment 4. The user may have taken other versions along the way, but these above are the ones the user proceeded from, having been satisfied. Now there are five versions of segment 4 (4A,4B,4C,4D,4E). The extent of knowledge the system has for the user is that the user has completed 1A, 2B, 3C with satisfaction. No user preference or user profile information is available. The historical data may reveal that of all the past users who also started with 1A, 2B, 3C, the majority were satisfied with 4E next, and most were dissatisfied with version 4D. The selection then is to present 4E to the user. If that does not work, maybe present other ones, but 4D is presented last. The content is being adapted in this example by tracking what is working for the user and comparing with past users that had similar taste/abilities/goals.

Service provider 10 may also collect data from prior sessions with users 40 and store it as historical data for future reference. For example, the historical data includes personal information of other users 40 who have been provided with digital content 300. The historical data also includes feedback and comments from users 40, their success/failure results, etc. on each version of each segment of digital content 300 and other digital contents. The personal information and historical data may be stored in database 180 shown in FIGS. 1 and 2.

Based on the analysis of the personal information and historical data, service provider 10 selects and delivers the most suitable version of segment 1 310 to user 40A. For example, service provider 10 may select version C 310C of first segment 310 as the most suitable version for user 40A and deliver version C 310C to user device 20A. Alternatively or additionally, user 40A may be provided with an option of selecting one of versions 310A, 310B, 310C, etc. of first segment 310 based on, for example, description of each versions, suggestions from other users 40, etc. In doing so, user 40A may consider the selection by service provider 10. Such self-selection option may always be available to user 40A throughout the entire process.

Service provider 10 may monitor how often user 40A had to pause, rewind and replay version C 310C. Such interruption may be stored in the historical data. Service provider 10 may detect such events to automatically record users 40 satisfaction feedback in addition to the feedback provided by users 40. When a significant number of users 40 have paused, rewound and replayed the same portion of version C 310C, service provider 10 may determine that the particular portion is not the most suitable for future users with similar personal information, or the particular portion has a problem, and the content of version C 310C may be edited or divided to make the content easier to understand. For example, new content may be added or a new segment may be created to present the problematic portion in detail. The service provider 10 may also skip a portion of version 310C or segment 310 entirely based on the personal information of user 40A and the historical data. When a significant number of users 40 fast-forwarded all or a portion of version C 310C, service provider 10 may determine that all or the portion of version C 310C is not the most suitable for future users with similar personal information, or service provider 10 may edit the content of version 310C to make it shorter, or delete version C 310C entirely. As such, the digital content 300 may be modified based on user activities.

When version C 310C is not satisfactory to user 40A, user 40A may terminate the delivery of version C 310C anytime during the delivery, which may be reported to service provider 10 for analysis and future reference. After user 40A completes version C 310C, service provider 10 may perform a survey or test on user 40A to learn how satisfied user 40A is or how much knowledge user 40A has acquired from version C 310C. Such survey or test may be also performed when user 40A prematurely terminates version C 310C. When user 40A terminates version C 310C prior to completion, or the survey or test result indicates that user 40A is not satisfied or failed to acquire the required knowledge from version C 310C, service provider 10 may automatically select another version of first segment 310 for user 40A. For example, service provider 10 may select version A 310A as shown in FIG. 3. Alternatively, user 40A may be given an option to select another version of first segment 310. Further, when user 40A terminates version C 310C prior to completion, the survey or test result may indicate and record in the historical data that version C 310C was too easy for user 40A.

When user 40A completes version A 310A, service provider 10 may perform a survey or test as noted above, and the survey or test result is collected by service provider 10 and taken into the consideration when service provider 10 predicts the most suitable version of the next segments for user 40A. This may be repeated regularly, for example, after each segment is completed by user 40A. The collected survey or test result of user 40A is also used as the historical data, which may help service provider 10 more accurately select the most suitable versions for user 40A and other users 40 in the future. By collecting more historical data from more users 40, service provider 10 may be able to more accurately select the most suitable versions for users 40 in the future.

The subsequent segments are sequentially delivered to user 40A. Service provider 10 selects the most suitable version for user 40A prior to delivering each segment. For example, as shown in FIG. 3, version B 330B is selected for segment M 330, and then version C 340C is selected for segment N 340, which is the last segment of content 300. After completing version C 340C of segment N 340, service provider 10 may perform a final survey or test on the entire content 300. The final survey or test result is also provided to service provider 10 for analysis and future reference.

In an embodiment, service provider 10 may add a new portion to, remove a portion of, and edit or modify the existing content of segments 310, 320, 330, 340 of digital content 300. Also, service provider 10 may classify or tag each version with one or more parameters, such as, e.g., language, skill level, file type, etc., which may help identify the most suitable version for users 40. For example, a version may be tagged with "Spanish," "Linux™ Expert," and "Text Only," and only the Spanish speaking users who are an expert in Linux™ and prefer text-based presentation may be provided with the particular version.

In an embodiment, digital content 300 is a course material for an online training service. The course material may be any type of computer data that may be distributed to users 40 via communication channels 30. The course material may include, for example, texts, an image, a sound clip, a moving picture, a link to an external source (e.g., uniform resource locator ("URL"), network path, etc.), and any combination thereof. Each segment of the course material may be a chapter or a group of chapters. For example, segment 1 310A may be the first chapter. Version A 310A may be a multimedia version, version B 310B may be an audio version, and version C 310C may be a text and image only version for hearing-impaired users.

Figure 4:
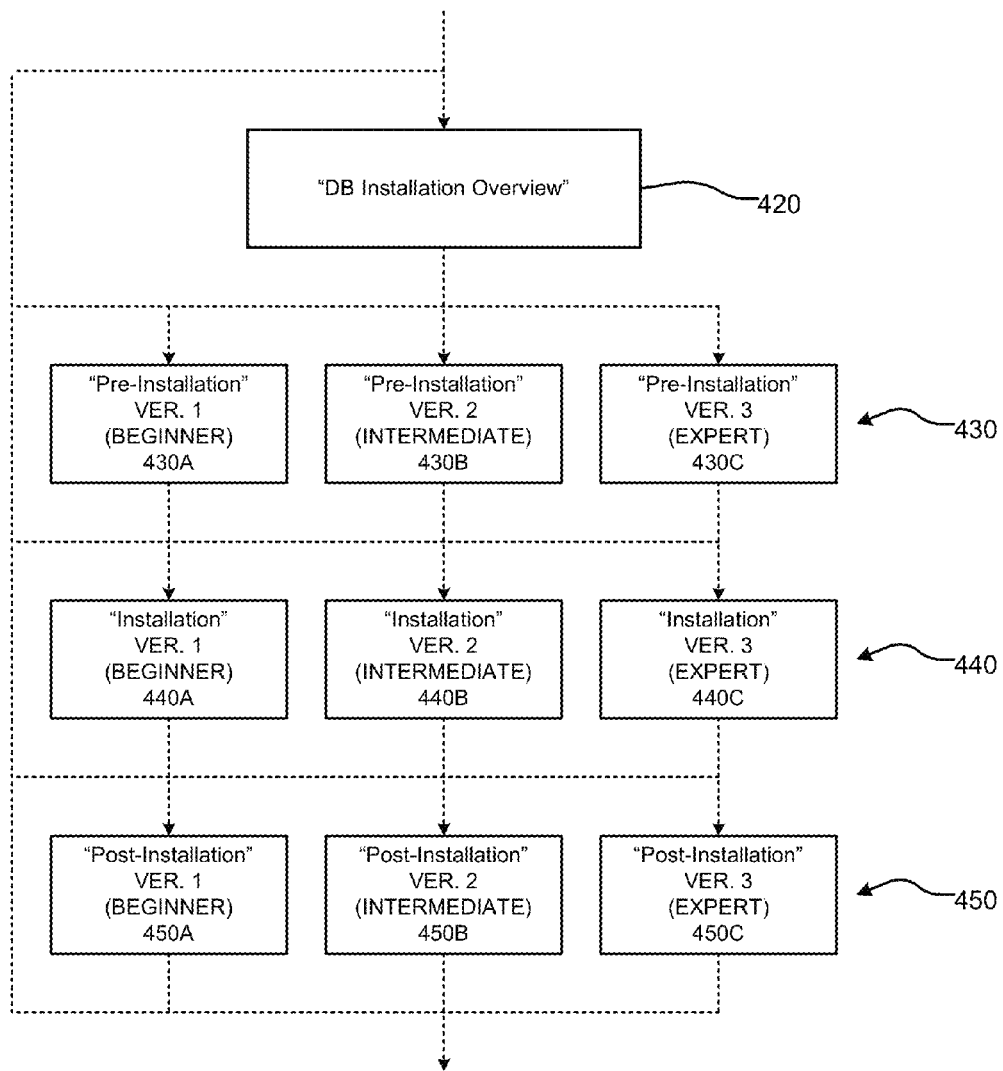
FIG. 4 illustrates an example of a segmentation/arrangement of digital content for an online database installation training in accordance with one embodiment.

FIG. 4 is an example of a segmentation/arrangement of digital content 400 for an online database training course according to one embodiment. Digital content 400 may be a course material that is divided into a plurality of segments, for example, "DB Installation Overview" segment 420, "Pre-installation" segment 430, "Installation" segment 440, and "Post-Installation" segment 450. Each segment may include one or more versions. For example, "DB Installation Overview" segment 420 may have only one version. Each of "Pre-installation" segment 430, "Installation" segment 440, and "Post-Installation" segment 450 have three versions, such as, first version 430A, 440A, 450A (beginners), second version 430B, 440B, 450B (intermediate), and third version 430C, 440C, 450C (expert).

Figure 5:
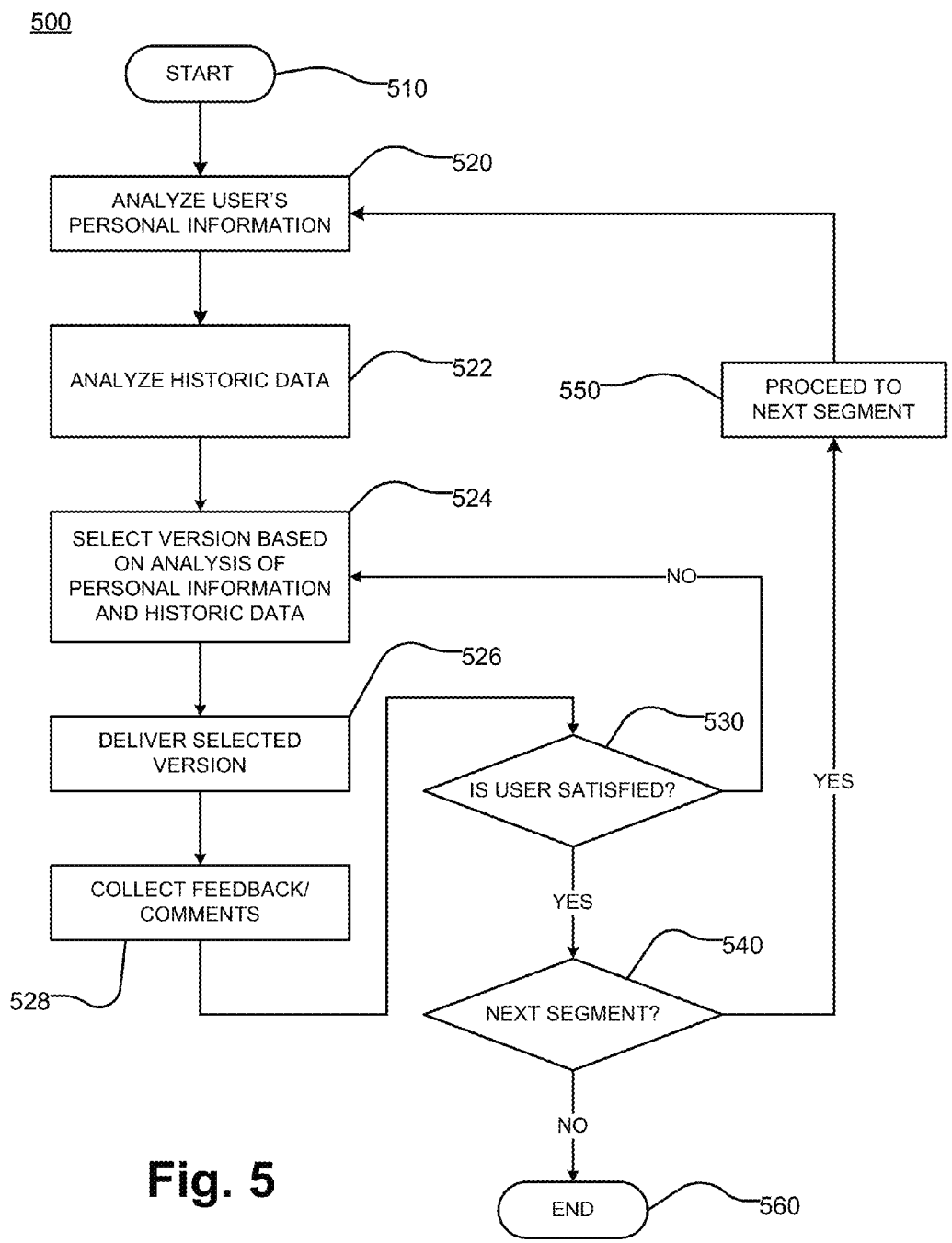
FIG. 5 illustrates a flowchart of the functionality of a service provider of FIG. 2 when providing an adaptive content delivery service in accordance with one embodiment.

FIG. 5 is a flow diagram of the functionality of service provider 10 of FIG. 2 to deliver digital content 400 of FIG. 4 to one of users 40, for example, user 40B of FIG. 2 in accordance with one embodiment. In one embodiment, the functionality of the flow diagram of FIG. 5 is implemented by software, e.g., adaptive content delivery module 134 of FIG. 1, stored in memory 130 or other computer readable or tangible medium, and executed by processor 120. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 510, service provider 10 starts an adaptive content delivery process 500. At 520, service provider 10 analyzes the personal information of user 40B. At 522, adaptive content delivery module 134 analyzes the historical data in relation with the personal data of user 40B. As noted above, the historical data may include the comments, feedback, survey/test result, pass/fail record, etc. from users 40. If user 40B has previously taken another course, the comments, feedback, survey/test result, pass/fail record, etc. from the previous course may also be included in the historical data.

At 524, service provider 10 then selects one of the versions based on the analysis of the personal information and the historical data. In the case that a segment has only one version, e.g., "DB Installation Overview" segment 420 in FIG. 4, the selection step at 524 may be skipped. In the case that a segment has two or more versions, service provider 10 selects one of the versions as the most suitable version for user 40B.

At 526, service provider 10 then delivers the selected version to user device 20B via communication channels 30. At 528, service provider 10 collects feedback/comments on the version from user 40B to learn whether user 40B has understood the content of the version, whether the version has met his or her needs, and to determine whether user 40B is ready to proceed to the next segment. For example, service provider 10 may deliver a question, quiz, survey, etc. to user device 20B. In particular, user device 20B may display a simple question, such as, e.g., "Did you understand this chapter?" along with several preselected answers, such as, e.g., "Yes," "No," "I am not sure," "I'd like to try a different version," etc. Other methods of collecting feedback/comments are also contemplated, including how much user 40B had to rewind, fast forward, or stop the delivery of the segment, and the total time user 40B needed to complete the segment.

At 530, service provider 10 determines whether user 40B is satisfied with the version based on the feedback/comments collected from user 40B at 528. If user 40B is not satisfied (NO at 530), process 500 loops back to selecting another version for user 40B (at 524). The most recent feedback/comments from user 40B (at 528) may be stored in the historical data and taken into the consideration in selecting another version for user 40B (at 524).

If user is satisfied (YES at 530), service provider 10 checks if there is a next segment (at 540). If there is no next segment (NO at 540), service provider 10 may determine that the last segment has been delivered to user 40B and terminate process 500 (at 560). If the next segment is available (YES at 540), service provider 10 proceeds to the next segment (at 550), and process 500 may loop back to analyzing the personal information of user 40B at 520.

Referring to FIG. 4, in an embodiment, "Pre-Installation" segment 430A may require an operating system ("OS") skill, e.g., Linux™, "Installation" segment 440 may require a database ("DB") skill, and "Post-Installation" segment 450 may require the Linux™ skill. If the personal information indicates that user 40b is a DB expert but has a beginner level of understanding on Linux™, service provider 10 may select and deliver beginner version 430A for "Pre-Installation" segment 430A, expert version 440B for "Installation" segment 440, and then beginner version 450A for "Post-Installation" segment 450. For a different user, for example, user 40C, who is an OS expert and has an intermediate level of understanding on databases, service provider 10 may select and deliver expert version 430C for "Pre-Installation" segment 430A, intermediate version 440B for "Installation" segment 440, and then expert version 450C for "Post-Installation" segment 450.

Figure 6:
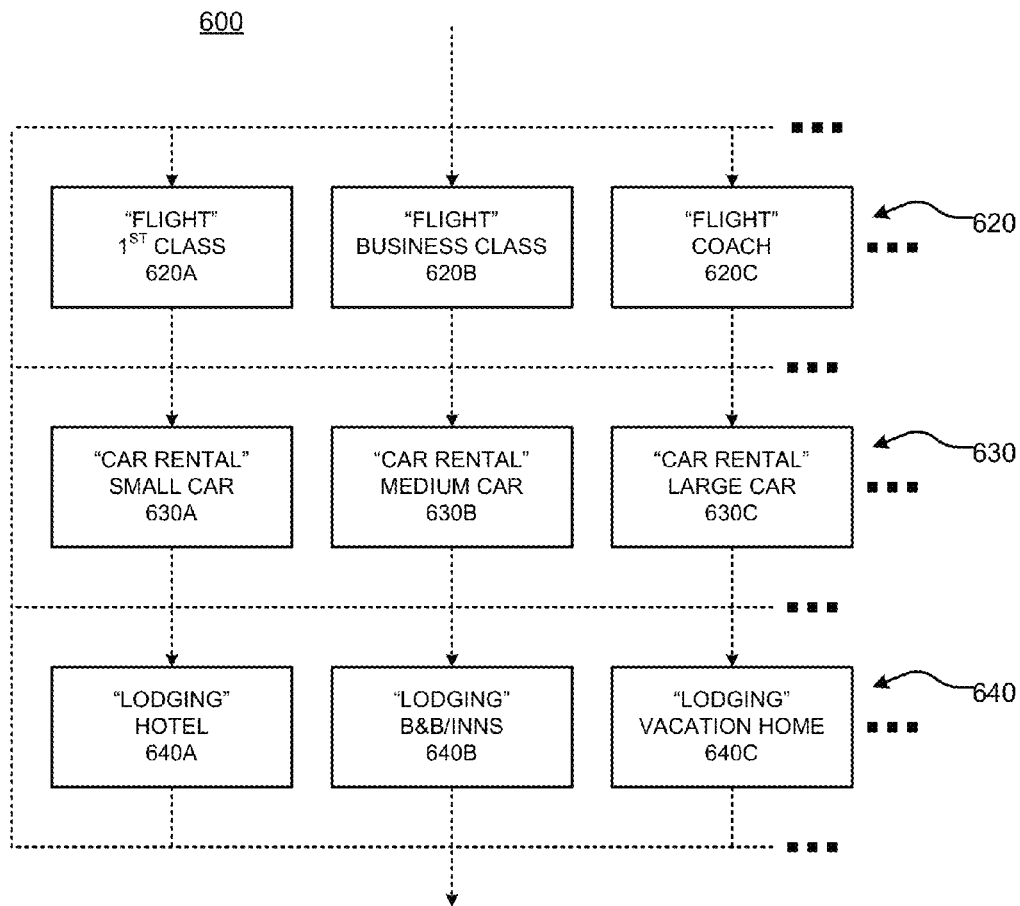
FIG. 6 illustrates an example of a segmentation/arrangement of digital content for an online reservation service in accordance with one embodiment.

In another embodiment, the adaptive content delivery service is applied to online commercial transactions. For example, FIG. 6 is an example of a segmentation/arrangement of digital content 600 for an online reservation service. Digital content 600 is segmented to a plurality of reservation items, for example, "Flight" 620, "Car Rental" 630, "Lodging" 640, etc. The number of reservation items may vary. For example, reservation data 600 may include additional reservation items, such as, e.g., "Entertainment," "Events," etc. Each reservation items may include one or more options. For example, "Flight" reservation item 620 may include a plurality of flight options, such as, e.g., "$1^{st}$ Class" option 620A, "Business Class" option 620B, "Coach" option 620C, etc. "Car Rental" reservation item may include a plurality of rental options, such as, e.g., "Small Car" option 630A, "Medium Car" option 630B, "Large Car" option 630C, etc. "Lodging" reservation item 640 may include a plurality of lodging options, such as, e.g., "Hotel" option 640A, "Bed & Breakfast/Inns" option 640B, "Vacation Home" option 640C, etc. A number of options for each reservation item may vary.

Service provider 10 may select the most suitable option of each reservation item for each of users 40. For example, the personal information of user 40C may indicates that he prefers the best/most expensive options available for a trip. Then, service provider 10 may automatically select, for example, "$1^{st}$ Class" option 620A for "Flight" reservation item 620, "Large Car" option 630C for "Car Rental" reservation item 630, and "Hotel" option 640A for "Lodging" reservation item 640. For a different user, e.g., user 40A, who prefers the most economic options available, service provider 10 may select, for example, "Coach" option 620C for "Flight" reservation item 620, "Small Car" option 630A for "Car Rental" reservation item 630, and "B&B/Inns" option 640B for "Lodging" reservation item 640.

The same principle may be applied to an online pizza delivery business, which may provide a series of selectable items, such as, e.g., "crust," "size," "topping," "beverage," "delivery time," "payment method," etc. For the "crust" selectable item, several options, such as, e.g., "hand-tossed," "deep dish," "crunch thin," "Brooklyn style," etc. may be made available for selection. Based on the personal information and the historical data, each of users 40 may be provided with a series of recommendations for the selectable items for pizza.

Figure 7:
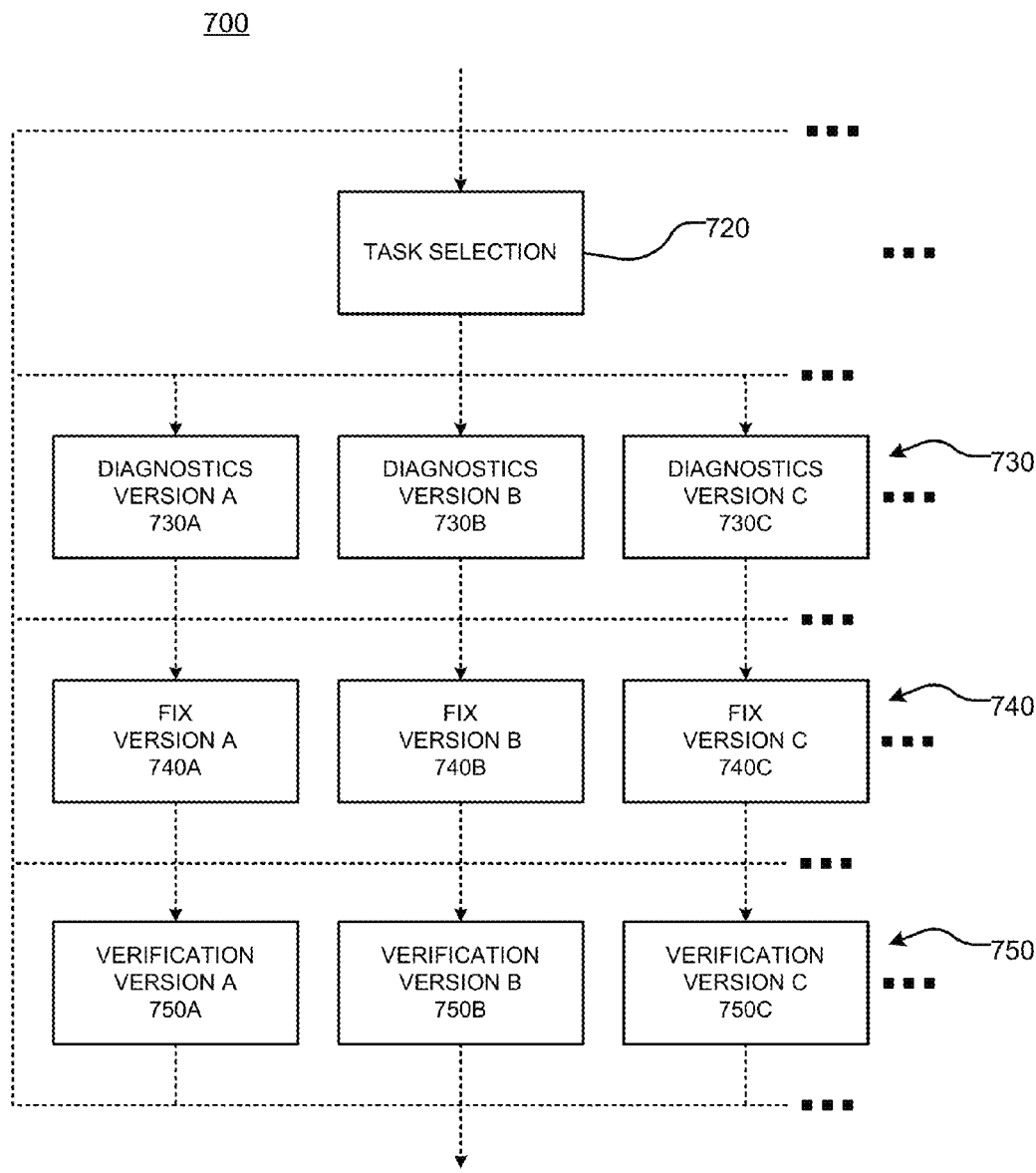
FIG. 7 illustrates an example of a segmentation/arrangement of digital content for an online assistance service in accordance with one embodiment.

In another embodiment, the adaptive content delivery service is applied to providing an online assistance service, such as, e.g., configuration, installation, maintenance, upgrading, patching, trouble-shooting, etc., of a product or service, such as, e.g., system, electronic device, machine, equipment, database, OS, software application, etc. FIG. 7 is an example of a segmentation/arrangement of digital content 700 for providing such technical assistance service. In an embodiment, digital content 700 may include a plurality of segments, such as, e.g., "Task Selection" segment 720, "Diagnostics" segment 730, "Fix" segment 740, and "Verification" segment 750, etc. Each of segments 720, 730, 740, 750 includes one or more versions. For example, task selection segment 720 may have a single version for presenting, e.g., descriptions of a plurality of error symptoms, most frequently asked questions, links to various solutions, etc. The user's personal information, such as, e.g., product/service purchase history may be used to determine the content for task selection segment 720. For example, when the personal information indicates that user 40A has purchased an equipment, service provider 10 may search the historical data to find common problems/errors associated with the particular equipment. Then, service provider 10 may present a list of the common problems/errors as the content for the task selection segment 720.

When a particular problem or error is identified and the task to be perform for fixing the identified problem or error is selected, service provider 10 then analyzes the personal information of user 40A and the historical data to determine which one of three versions 730A, 730B, 730C of "Diagnostics" segment 730 is the most suitable for assisting user 40A to carry out the diagnostics. For example, when the personal information indicates that user 40A is a Linux™ expert, a version that a Linux™ expert could benefit the most from may be selected and delivered to user 40A. Versions for "Fix" segment 740 and "Verification" segment 750 may be selected and delivered to user 40A in a similar manner. The historical data may include previous online technical assistance sessions conducted for user 40A, which can provide a list of problems/errors that user 40 has previously encountered and the most effective way to deliver contents for diagnosing and fixing the problems/errors and verifying whether the problems/errors have been fixed.

The adaptive content delivery service may also be applied to assisting a shopper to pick a combination of related product in a shopping cart application, for example, online "buildyour-own" automotive retail, online "do-it-yourself" computer system retail, online "plan-it-yourself" travel/vacation booking, etc.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable storage medium having instructions stored thereon, wherein the instructions, when executed by a processor, cause the processor to adaptively deliver digital information to a user, the delivery comprising:
    retrieving the digital information comprised of a plurality of segments arranged in sequential order, each segment comprising one or more options, each option presenting content of the segment in a different way from other options of the segment;
    selecting an option for the user for each segment;
    delivering the selected option for each segment to the user in the sequential order, a selected option for a next segment in the sequential order being delivered to the user after a selected option for a previous segment is completed by the user; and
    receiving feedback on at least one of the options delivered to the user,
    wherein the delivery further comprises analyzing personal information of the user and analyzing historical data of selection of options for the different segments for a plurality of users, and
    wherein the selecting the option for each segment is based at least in part on the personal information and the historical data.

2. The non-transitory computer readable storage medium of claim 1, wherein the personal information comprises at least one of: the user's preferences, age, sex, language, location, disabilities, nationality, educational level, skill level, interest level, familiarity with the topics, goals or product/service purchase history.

3. The non-transitory computer readable storage medium of claim 1, wherein the historical data comprises feedback on a plurality of options delivered to the plurality of users.

4. The non-transitory computer readable storage medium of claim 3, wherein the historical data further comprises the feedback on at least one option delivered to the user.

5. The non-transitory computer readable storage medium of claim 1, wherein the digital information comprises content for at least one of: an online course, an online presentation, an online promotion, an online assistance service, or an online commercial transaction.

6. The non-transitory computer readable storage medium of claim 5, wherein the plurality of segments for the online course correspond to a plurality of chapters.

7. The non-transitory computer readable storage medium of claim 5, wherein the online commercial transaction comprises an online reservation, and the plurality of segments for the online reservation correspond to a plurality reservation items.

8. The non-transitory computer readable storage medium claim of claim 5, wherein the plurality of segments for the online assistance service correspond to a plurality of steps to fix an error or problem.

9. A method for adaptively delivering digital information to a user, the method comprising:
    retrieving the digital information comprised of a plurality of segments arranged in sequential order, each segment comprising one or more options, each option presenting content of the segment in a different way from other options of the segment;
    selecting, using a computing device, an option for the user for each segment;
    delivering the selected option for each segment to the user in the sequential order via a communication channel, a selected option for a next segment in the sequential order being delivered to the user after a selected option for a previous segment is completed by the user; and
    receiving feedback on at least one of the options delivered to the user via the communication channel,
    wherein the selecting comprises:
        collecting personal information of the user;
        collecting historical data of selection of options for the different segments for a plurality of other users: and
        analyzing the personal information and the historical data to select the most suitable option for the user.

10. The method of claim 9, wherein the personal information comprises at least one of: the user's preferences, age, sex, language, location, disabilities, nationality, educational level, skill level, interest level, familiarity with the topics, goals or product/service purchase history.

11. The method of claim 9, wherein the historical data comprises:
    feedback on the options delivered to the plurality of other users; and
    the feedback on at least one the options delivered to the user.

12. The method of claim 9, wherein the digital information comprises at least one of: content for an online course, an online presentation, an online promotion, an online assistance service, or online commercial transaction.

13. A system for adaptively delivering digital information to a user, comprising:
    a processor; and
    a non-transitory computer readable storage medium coupled to the processor and storing instructions, which, when executed by the processor, cause the processor to:
    retrieve the digital information comprised of a plurality of segments arranged in sequential order, each segment comprising one or more options, each option presenting content of the segment in a different way from other options of the segment;
    select an option for the user for each segment;
    deliver the selected option for each segment to the user in the sequential order, a selected option for a next segment in the sequential order being delivered to the user after a selected option for a previous segment is completed by the user; and
    receive feedback on at least one of the options delivered to the user,
    wherein the instructions when executed by the processor, further cause the processor to:
        collect personal information of the user;
        collect historical data of selection of options for the different segments for a plurality of users; and
        analyze the personal information and the historical data to select the most suitable option for the user.

14. The system of claim 13, wherein the personal information comprises at least one of: the user's preferences, age, sex, language, location, disabilities, nationality, educational level, skill level, interest level, familiarity with the topics, goals or product/service purchase history.

15. The system of claim 13, wherein the historical data comprises:
   feedback on the digital information delivered to the plurality of users; and
   the feedback on at least one of the options delivered to the user.

16. The system of claim 13, wherein the digital information comprises at least one of: content for an online course, an online presentation, an online promotion, an online assistance service, or an online commercial transaction.

17. The non-transitory computer readable storage medium of claim 1, the delivery further comprising analyzing historical data of selection of options for the different segments for a plurality of users, wherein the selecting the option for each segment is based at least in part on the feedback and the historical data.

18. The method of claim 9, further comprising analyzing historical data of selection of options for the different segments for a plurality of users, wherein the selecting the option for each segment is based at least in part on the feedback and the historical data.

\* \* \* \* \*

UNITED STATES PATENT AND TRADEMARK OFFICE
CERTIFICATE OF CORRECTION

| | | |
|---|---|---|
| PATENT NO. | : 8,996,519 B2 | Page 1 of 1 |
| APPLICATION NO. | : 13/417678 | |
| DATED | : March 31, 2015 | |
| INVENTOR(S) | : D'Orazio Pedro de Matos | |

It is certified that error appears in the above-identified patent and that said Letters Patent is hereby corrected as shown below:

In the claims

Column 9, lines 62-63, claim 8, delete "storage medium claim" and insert -- storage medium --, therefor.

Signed and Sealed this
Third Day of November, 2015

Michelle K. Lee
*Director of the United States Patent and Trademark Office*